(12) United States Patent
Edwards et al.

(10) Patent No.: US 9,911,514 B2
(45) Date of Patent: Mar. 6, 2018

(54) NUCLEAR REACTOR CAVITY FLOOR PASSIVE HEAT REMOVAL SYSTEM

(71) Applicant: BWXT mPower, Inc., Charlotte, NC (US)

(72) Inventors: Tyler A Edwards, Lynchburg, VA (US);
Gary W Neeley, Forest, VA (US);
James B Inman, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 446 days.

(21) Appl. No.: 14/299,016

(22) Filed: Jun. 9, 2014

(65) Prior Publication Data

US 2015/0357057 A1    Dec. 10, 2015

(51) Int. Cl.
*G21C 9/016* (2006.01)
*G21C 9/00* (2006.01)

(52) U.S. Cl.
CPC .............. *G21C 9/00* (2013.01); *G21C 9/016* (2013.01); *Y02E 30/40* (2013.01)

(58) Field of Classification Search
CPC ................................. G21C 9/016; G21C 9/00
USPC .................................................. 376/280, 298
See application file for complete search history.

(56) References Cited

U.S. PATENT DOCUMENTS 3,503,849 A   3/1970  Yevick et al.
3,607,630 A * 9/1971  West ...................... G21C 9/016
                                                         376/280
3,888,730 A * 6/1975  Jackson ................. G21C 15/12
                                                         376/290
(Continued)

FOREIGN PATENT DOCUMENTS

WO    WO 1998/32134    * 7/1998 ............. G21C 9/016

OTHER PUBLICATIONS

Bitterman, "Main Features of the Core Melt Stabilization System of the European Pressurized Water Reactor (EPR)", 18th International Conference on Structural Mechanics in Reactor Technology, SMiRT18-P01-11, Aug. 2005.*

(Continued)

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

A nuclear reactor includes a reactor core disposed in a reactor pressure vessel. A radiological containment contains the nuclear reactor and includes a concrete floor located underneath the nuclear reactor. An ex vessel corium retention system includes flow channels embedded in the concrete floor located underneath the nuclear reactor, an inlet in fluid communication with first ends of the flow channels, and an outlet in fluid communication with second ends of the flow channels. In some embodiments the inlet is in fluid communication with the interior of the radiological containment at a first elevation and the outlet is in fluid communication with the interior of the radiological containment at a second elevation higher than the first elevation. The radiological containment may include a reactor cavity containing a lower portion of the pressure vessel, wherein the concrete floor located underneath the nuclear reactor is the reactor cavity floor.

15 Claims, 4 Drawing Sheets

(56) References Cited

U.S. PATENT DOCUMENTS

| | | | |
|---|---|---|---|
| 3,930,939 A * | 1/1976 | Bittermann | G21C 9/016 376/280 |
| 4,035,974 A * | 7/1977 | Kumpf | G21C 13/04 376/285 |
| 4,036,688 A | 7/1977 | Golden et al. | |
| 4,045,284 A | 8/1977 | Rosewell | |
| 4,062,724 A | 12/1977 | Broadley | |
| 4,072,567 A | 2/1978 | Yokobayashi | |
| 4,342,621 A * | 8/1982 | Keating | G21C 9/016 376/298 |
| 4,978,496 A * | 12/1990 | Dumas | G21C 9/016 376/280 |
| 5,057,271 A | 10/1991 | Turricchia | |
| 5,659,589 A * | 8/1997 | Wistuba | G21C 9/016 376/280 |
| 6,192,097 B1 * | 2/2001 | Hau | G21C 9/016 376/280 |
| 2012/0051485 A1 * | 3/2012 | Goda | G21C 9/016 376/280 |
| 2012/0300893 A1 * | 11/2012 | Kurita | G21C 9/016 376/280 |

OTHER PUBLICATIONS

Foit, "Quenching of Melt Layers by Bottom Injection of Water in the COMET", 3rd European Review Meeting on Severe Accident Research (ERMSAR-2008).*

Sato, "Two types of a passive safety containment for a near future BWR with active and passive safety systems", Nuclear Engineering and Design 239 (2009) 1682-1692.*

International Search Report and Written Opinion dated Sep. 8, 2015 for PCT/US2015/034678.

* cited by examiner

NUCLEAR REACTOR CAVITY FLOOR PASSIVE HEAT REMOVAL SYSTEM

This invention was made with Government support under Contract No. DE-NE0000583 awarded by the Department of Energy. The Government has certain rights in this invention.

BACKGROUND

The following pertains to the nuclear reactor arts, nuclear power arts, nuclear reactor safety arts, radiological release containment arts, and related arts.

Nuclear power plants incorporate safety systems to continue radioactive reactor core cooling in the event of a safety-related reactor shutdown. These systems are commonly referred to as emergency core cooling (ECC) systems. During a safety-related reactor shutdown, the nuclear chain reaction operating on the fissile isotope ($^{235}$U in the case of typical light water reactors employing enriched uranium fuel) is terminated almost immediately by release (or "SCRAM") of neutron-absorbing control rods which are arranged to fall into the nuclear reactor core under gravity. The shutdown provided by the control rods is supplemented in some reactor designs by injection of a soluble neutron poison (typically a soluble boron compound) into the reactor pressure vessel. However, after termination of the nuclear chain reaction by the SCRAM, the radioactive core continues to generate residual decay heat due to continuing decay of unstable isotopes which were formed in the core as intermediate products of the nuclear chain reaction. These unstable isotopes have half-lives for spontaneous decay on the order of minutes, hours, days, or longer, and the residual decay heat from these radioactive isotopes is accommodated by the ECC system. Active ECC system designs employ pumps to inject water to provide the emergency core cooling, with batteries and/or standby diesel generators providing backup power. Passive ECC system designs rely on automatic depressurization to lower reactor coolant system (RCS) pressure to allow passive injection of water. If the ECC system operates as designed, damage to the nuclear reactor core is minimized or prevented completely.

In the United States, the Nuclear Regulatory Commission (NRC) requires that every nuclear power plant incorporate additional safety systems designed to operate in the event of an ECC system failure. Other nuclear regulatory jurisdictions typically have similar regulations. In an ECC system failure, residual decay heat is not removed in an effective manner, and the nuclear fuel assemblies and surrounding steel structures may melt and form a molten mass sometimes referred to as "corium" that relocates to the bottom of the reactor pressure vessel. During nuclear meltdown, the most severe type of nuclear reactor failure, the high temperature of the corium ($UO_2$ melts around 3100K) may be sufficient to cause the corium to further melt through the bottom of the reactor vessel and relocate to the floor of the radiological containment structure. To accommodate such an ex vessel retention scenario, the floor of the radiological containment beneath the reactor pressure vessel is lined with high temperature insulating tiles, for example made of zirconium dioxide or zirconia, to minimize interaction of the corium with the concrete. The lower portion of the reactor pressure vessel is typically located in a cavity in the containment floor, which is filled with water. The molten core is allowed to spread out over the cavity floor to a more readily cooled geometry.

BRIEF SUMMARY

In some embodiments described herein as illustrative examples, a nuclear island comprises: a nuclear reactor including a reactor core comprising fissile material disposed in a reactor pressure vessel; a radiological containment containing the nuclear reactor, the radiological containment including a concrete floor located underneath the nuclear reactor; and an ex vessel corium retention system including flow channels embedded in the concrete floor located underneath the nuclear reactor, an inlet in fluid communication with first ends of the flow channels, and an outlet in fluid communication with second ends of the flow channels. In some embodiments the inlet is in fluid communication with the interior of the radiological containment at a first elevation and the outlet is in fluid communication with the interior of the radiological containment at a second elevation higher than the first elevation. In further embodiments a refueling water storage tank (RWST) is disposed inside the radiological containment and is connected with the inlet to drain water from the RWST into the inlet. In some additional embodiments the radiological containment includes a reactor cavity in which a lower portion of the reactor pressure vessel is disposed, and the concrete floor located underneath the nuclear reactor is the reactor cavity floor. In such embodiments, the inlet may comprises a flow channel embedded in a sidewall of the reactor cavity, and the outlet may also comprise a flow channel embedded in a sidewall of the reactor cavity. The flow channels embedded in the concrete floor located underneath the nuclear reactor may comprise metal, ceramic, or plastic (e.g. PVC) pipes embedded in the concrete floor located underneath the nuclear reactor, or may comprise tubular vacancies in the concrete floor located underneath the nuclear reactor. Such tubular vacancies may be formed by pouring the concrete floor located underneath the nuclear reactor over tubular elements, allowing the poured concrete to set, and then removing the tubular elements. The ex vessel corium retention system may further include zirconia insulation disposed on the concrete floor located underneath the nuclear reactor, and may further include a concrete layer disposed on the zirconia insulation. The ex vessel corium retention system may further include one or more metal plates embedded in the concrete floor located underneath the nuclear reactor.

In some further embodiments described herein as illustrative examples, a radiological containment comprises a containment structure having a reactor cavity including a reactor cavity floor, and an ex vessel corium retention system including flow channels embedded in the reactor cavity floor and having first ends connected with the reactor cavity and second ends opposite from the first ends also connected with the reactor cavity. The ex vessel corium retention system may further include: an inlet header embedded in at least one of the floor and sidewalls of the reactor cavity and in fluid communication with both the reactor cavity and the first ends of the flow channels embedded in the reactor cavity floor; and an outlet header embedded in at least one of the floor and sidewalls of the reactor cavity and in fluid communication with both the reactor cavity and the second ends of the flow channels embedded in the reactor cavity floor. In some embodiments the containment structure comprises a concrete floor defining the reactor cavity including the reactor cavity floor. In some embodiments the containment structure further comprises a steel structure having a lower portion embedded in the concrete floor.

In some embodiments described herein as illustrative examples, a nuclear island comprises a nuclear reactor including a reactor core comprising fissile material disposed in a reactor pressure vessel, and a radiological containment as set forth in the immediately preceding paragraph, wherein a lower portion of the reactor pressure vessel which contains the reactor core is disposed in the reactor cavity.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

It is recognized herein that existing ex vessel corium retention systems have certain disadvantages. The temperature of the corium can be as high as 2600-3100K in credible ex vessel retention scenarios, while concrete ablation occurs at temperatures as low as 1400-1600K. As a consequence, the corium overlaying the zirconia insulation tiles can lead over time to ablation of the underlying concrete, even in spite of the thermal insulation provided by the corium tiles. The thermal barrier provided by the zirconia tiles may also be compromised by gaps between the tiles (although the relatively high viscosity of corium helps mitigate this issue), and the melting point of $ZrO_2$ is comparable with the upper end of the credible corium temperature range. Even at temperatures below the concrete ablation temperature, thermal stresses introduced by the corium can lead to cracking of the concrete, and such cracking degrades the barrier provided by the concrete containment floor. Another disadvantage of existing ex vessel core retention systems is that they operate to remove heat from the corium predominantly at the exposed upper surface of the corium, where it is exposed to water filling the reactor cavity. This allows heat build-up at the bottom surface of the corium, proximate to the concrete floor.

Disclosed herein are improved ex vessel corium retention systems that mitigate these disadvantages.

Figure 1:
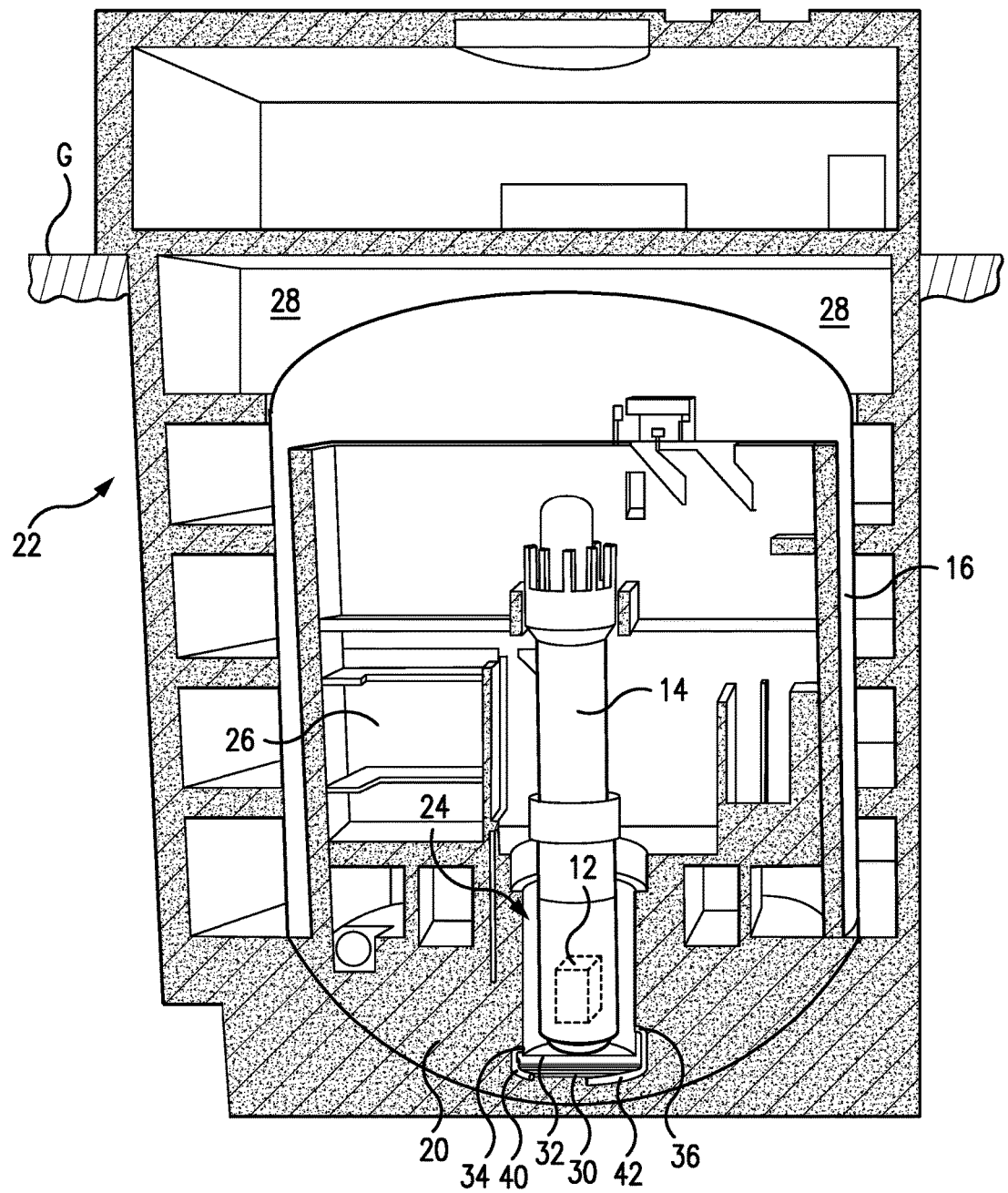
FIG. 1 diagrammatically shows a diagrammatic perspective view of an illustrative nuclear reactor island in partial cutaway to reveal internal components.

With reference to FIG. 1, a nuclear reactor system includes a nuclear reactor comprising a nuclear reactor core 12 disposed in a reactor pressure vessel 14. It is to be understood that the reactor pressure vessel 14, which is typically a stainless steel or other metal vessel, is opaque such that the nuclear reactor core 12 is occluded by the reactor pressure vessel 14; accordingly, FIG. 1 shows the reactor core 12 diagrammatically in phantom, i.e. using dashed lines, to indicate it is actually hidden from view being disposed inside the reactor pressure vessel 14. During reactor operation, the reactor pressure vessel 14 contains coolant, and the nuclear reactor core 12 includes a fissile material. In the illustrative examples, the nuclear reactor is a light water reactor employing a uranium composition such as uranium oxide ($UO_2$) enriched in the fissile $^{235}U$ isotope, and the coolant is purified water. However, other reactors are contemplated, such as a sodium-cooled nuclear reactor. During reactor operation, the nuclear reactor core 12 supports a nuclear fission chain reaction involving the fissile material (e.g. $^{235}U$), and the nuclear fission chain reaction generates heat in the core 12 that in turn heats the coolant in the reactor pressure vessel 14. The coolant serves as a heat transfer medium to transfer heat from the nuclear reactor core 12 to another component, such as a steam generator (in the case of a typical PWR-based nuclear power plant) or a turbine (in the case of a typical BWR-based plant). The illustrative nuclear reactor 12 is an integral PWR design in which the steam generators are located inside the reactor pressure vessel 14 (and hence are not visible). In other PWR designs (not shown) the steam generators are external units connected with the nuclear reactor by large-diameter piping. BWR designs (also not shown) typically omit the steam generator component because the coolant boils inside the reactor pressure vessel, and the boiling primary coolant directly serves as steam to drive the turbine via suitable large-diameter piping running between the BWR and the turbine.

The nuclear reactor is disposed inside a radiological containment 16, which is typically a steel or steel-reinforced concrete structure. The radiological containment 16 is designed to contain any radiological release from the nuclear reactor, for example in the event of a loss of coolant accident (LOCA) arising from a break in the reactor pressure vessel 14, or in a large-diameter pipe connecting with the reactor pressure vessel 14. The illustrative radiological containment 16 comprises a steel cylindrical structure with upper and lower ends closed off by top and bottom domes, respectively; however, other geometries, e.g. rectangular geometries, are contemplated. The illustrative radiological containment 16 further includes a concrete floor 20, and the lower portion of the steel cylindrical structure including its bottom dome is embedded in a concrete floor 20. (As used herein, the term "concrete" is to be understood as encompassing concrete materials of with various aggregates or fillers and optional additives or chemical admixtures, concrete materials with various cement or binder materials, steel-reinforced concrete, and so forth.) The radiological containment 16 is housed in, or part of, a reactor building 22 that is shown in partial cutaway in FIG. 1. In the illustrative example, the concrete floor 20 forms a lowermost floor of the containment building 22; however, in other embodiments the concrete floor may form a higher-level floor of the reactor building, or may not define any floor of the reactor building. The reactor building 22 houses the nuclear reactor and ancillary components. The reactor building 22 is sometimes referred to in the art by other nomenclatures, such as "reactor service building". The illustrative reactor building 22 is partially subterranean (where ground level is diagrammatically indicated by ground G), and the reactor pressure vessel 14 is wholly underground. However, it is contemplated for the reactor pressure vessel to be partially or entirely above-ground.

The concrete floor 20 of the illustrative radiological containment 16 includes (or defines) a reactor cavity 24, and the lower portion of the reactor pressure vessel 14 containing the nuclear reactor core 12 is disposed in the reactor cavity 24. An illustrative refueling water storage tank (RWST) 26 is located inside containment 16, which provides a local water supply for use during refueling of the reactor. In certain emergency core cooling (ECC) operations, or in response to an ex vessel retention event in which the reactor core 12 melts and forms a corium mass that relocates to the bottom of the pressure vessel 14 and then melts through to relocate to the floor of the reactor cavity 24, the RWST 26 may also be configured to flood the reactor cavity 24. Providing the reactor cavity 24 is advantageous in that it reduces the volume of water needed to ensure immersion of the lower portion of the reactor pressure vessel 14 containing the reactor core 12 during such events.

The nuclear island may include other features not illustrated or described herein, such as illustrative passive containment cooling tanks 28 located on the top dome of the radiological containment 16 which serve as the ultimate heat sink for the radiological containment 16.

Figure 2:
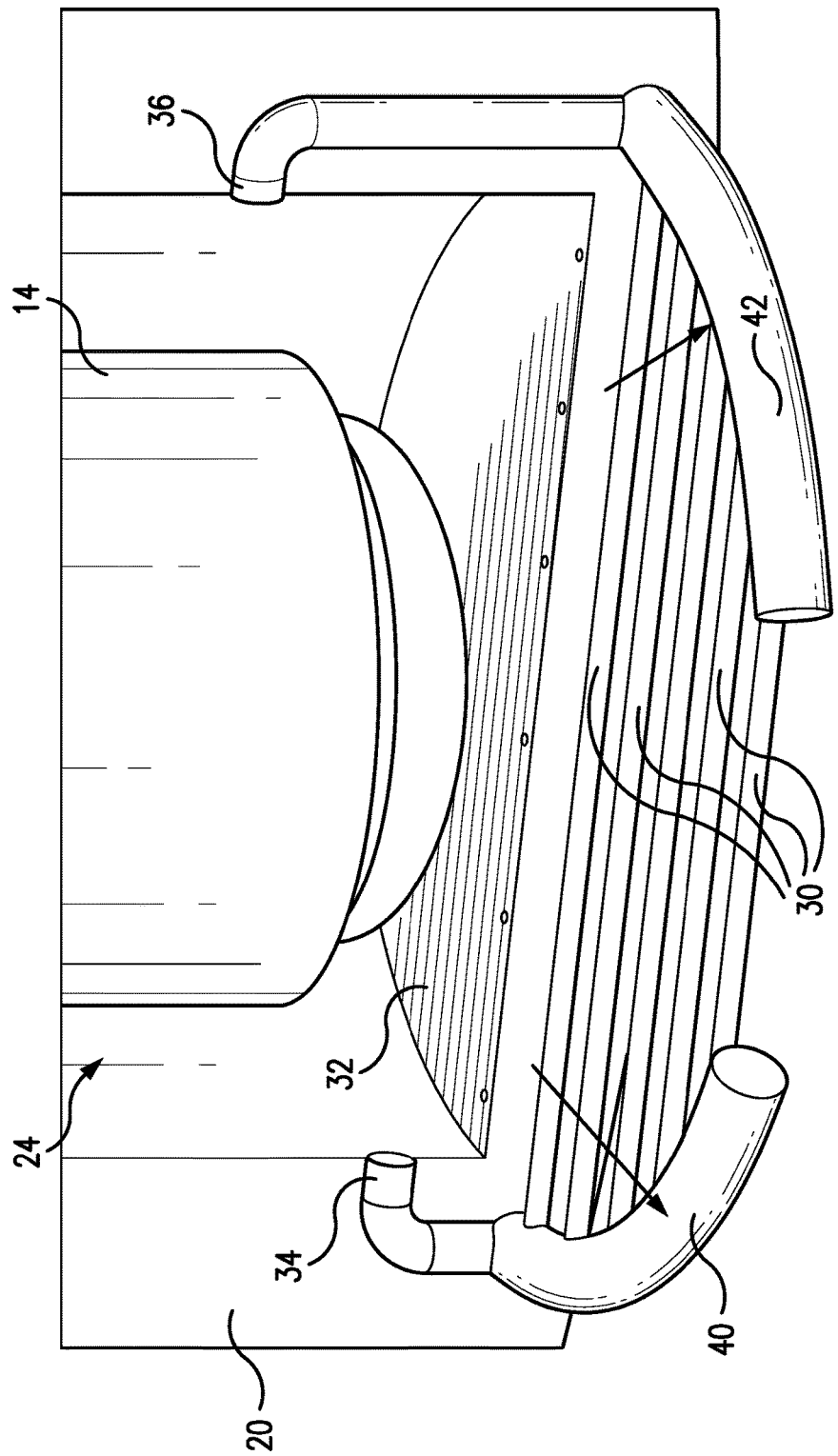
FIG. 2 diagrammatically shows a perspective view of the reactor cavity of the reactor island of FIG. 1 with the containment concrete shown in partial cutaway to reveal features of the reactor cavity floor passive heat removal system.
Figure 3:
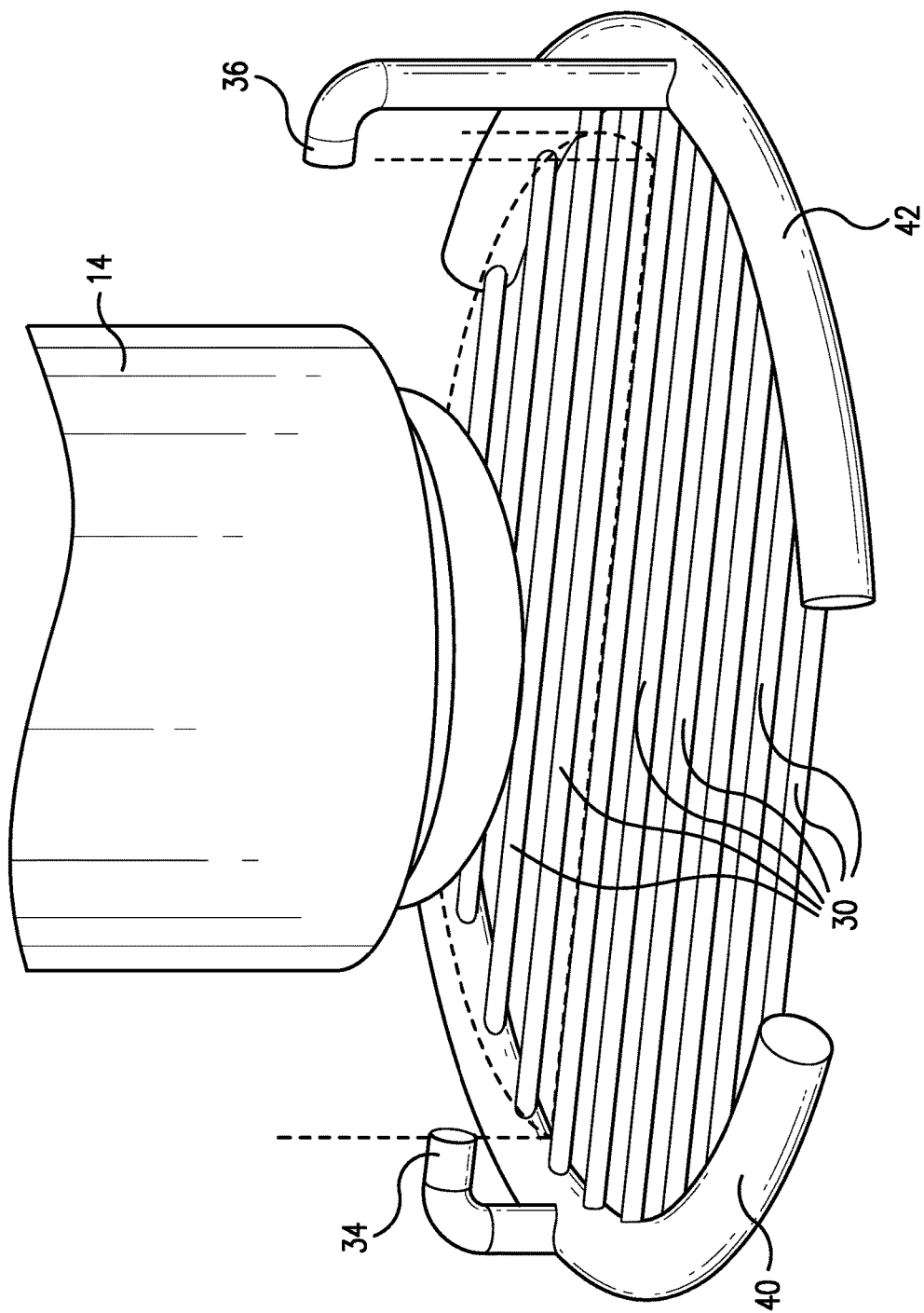
FIG. 3 diagrammatically shows a perspective isolation view of the lower reactor vessel head and the reactor cavity floor passive heat removal system of the reactor island of FIG. 1.

With reference to FIG. 1 and with further reference to FIGS. 2 and 3, an ex vessel corium retention system includes flow channels 30 embedded in the concrete floor 20 located underneath the nuclear reactor (that is, embedded in the reactor cavity floor 32 in the illustrative example). An inlet 34 is in fluid communication with first ends of the flow channels 30, and an outlet 36 is in fluid communication with second ends of the flow channels 30, so as to define a flow path from the inlet 34, through the flow channels 30, to the outlet 36. In the illustrative example, the inlet 34 is connected with the first ends of the flow channels 30 via an inlet header 40 that is embedded in the floor 32 or sidewall of the reactor cavity 24, and in similar fashion the outlet 36 is connected with the second ends of the flow channels 30 via an outlet header 42 that is embedded in the floor 32 or sidewall of the reactor cavity 24.

In a suitable approach providing natural (that is, thermally driven) recirculation of water through the flow channels 30, the inlet 34 is in fluid communication with the interior of the radiological containment 16 (and more particularly in the illustrative example with the reactor cavity 24) at a first elevation, and the outlet 36 is in fluid communication with the interior of the radiological containment 16 (and more particularly in the illustrative example with the reactor cavity 24) at a second elevation that is higher than the first elevation. The first elevation (for the inlet 34) is chosen to be sufficiently high so as to be above any corium melt that relocates ex vessel onto the reactor cavity floor 32, so as to ensure that corium melt material does not enter the inlet 34 and clog it. The second elevation (for the outlet 36) is chosen to provide the desired heat sinking. The outlet 36 may be located at an elevation below the waterline of water filling the reactor cavity 24 (for example, water drained into the reactor cavity 24 from the RWST 26), or may be at an elevation above that waterline. In either case, water flowing from the inlet 34 via the inlet header 40 into the flow channels 30 is converted to steam by heat from the corium melt located ex vessel on the reactor cavity floor 32, and this steam is expelled by the expanded volume of the steam through the outlet header 42 and outlet 36. It will be appreciated that in some embodiments the headers 40, 42 are omitted and each flow channel 30 may have its own individual inlet and outlet. An advantage of employing the headers 40, 42 (or at least the inlet header 40) is that it facilitates providing alternative or additional water sources—for example, it is contemplated to connect the drain of the RWST 26 to the inlet 34. The illustrative flow channels 30 are straight, which has advantages in terms of reduced likelihood of blockage due to formation of a steam bubble or the like. Alternatively, the flow channels can be non-straight, for example serpentine (that is, back-and-forth) so as to cover more area per flow channel. The illustrative flow channels 30 are horizontal, that is, parallel with the reactor cavity floor 24; however, precisely horizontal orientation is not necessary, and a sloped orientation is contemplated.

In the event of an accident which results in melted core material relocating ex vessel onto the reactor cavity floor 32, the reactor cavity 24 is flooded with water to provide external reactor vessel cooling. The flow channels 30 embedded in the reactor cavity floor 32 provides pathways for this water to flow underneath the corium melt. The inlet 34 is in fluid communication with the reactor cavity 24 through one or more openings (multiple openings may be used for redundancy, and similarly at the outlet side). The inlet 34 should be located at a sufficient elevation above the containment floor 32 to prevent corium material or debris from blocking the inlet 34 during the ex-vessel retention process. In the illustrative example, the inlet 34 leads to the inlet header 40 which distributes the containment flood-up water to each of the horizontal flow channels 30 embedded in the concrete floor 32 located underneath the nuclear reactor (that is, underneath the reactor pressure vessel 14). The outlet 36 of the ex vessel corium retention system includes one or more openings which are located sufficiently high so that a temperature difference capable of driving natural circulation exists between the inlet 34 and the outlet 36. Since the corium melt on the reactor cavity floor 32 is the heat source, the desired temperature difference to drive natural circulation is obtained by placing the outlet 36 at a second elevation that is higher than the first elevation of the inlet 34—the difference between the second and first elevations is chosen based on the expected thermal gradient which can be computed using thermal modeling of the water-filled reactor cavity 24. (In practice, a thin film of water vapor, sometimes referred to as leidenfrost, may form at the interface between the corium and the water, but the bulk of the volume of the reactor cavity 24 is expected to be filled with water from the RWST 26 or another source). In the illustrative example, the outlet 36 is connected to the outlet header 42 which receives heated water from the horizontal flow channels 30 embedded in the concrete of the cavity floor 32.

The ex vessel corium retention system provides defense in depth to minimize release of radioactive materials outside of the containment. The ex vessel corium retention system controls the flow of water from the reactor vessel cavity to maximize cooling of the concrete of the reactor cavity floor 32. Water flows through the flow channels 30 and is discharged to a suitable heat sink. While the illustrative heat sink is obtained by discharging via outlet 36 into the reactor cavity 24 at a suitably high elevation, other discharge points are contemplated. For example, the outlet could connect to a sparger feeding into the RWST 26, so that the steam is sparged into the RWST 26 (configuration not shown). In general, the hot water and steam mixture generated by cooling the reactor cavity floor concrete flows upward through the outlet header 42 to the outlet 36, where it is discharged to an environment at a sufficient elevation and temperature to support natural circulation.

During the ex vessel retention process, a long-term water supply to the reactor vessel cavity 24 drives operation of the system. The water may come from a source such as the RWST 26, and/or may come from the reactor pressure vessel 14 itself, for example in the case of a LOCA discharging coolant from the pressure vessel 14 into the radiological containment 16. For this latter approach, collection gutters on the inside of the upper containment dome are one option for collecting the escaped coolant water (which is typically released as steam) and conveying it into the reactor cavity 24. The cooling provided by the flow channels 30 embedded in the concrete floor 32 of the reactor cavity 24 reduces the likelihood (or extent, or rate) of concrete ablation through the reactor cavity floor 32. This minimizes potential concrete/corium interaction, which can be problematic as it can generate pressurization of the containment 16 due to combustible gas generation, potentially compromising containment integrity. In addition, the likelihood of the corium generating sufficient ablation of the concrete reactor cavity floor 32 to locally penetrate through the floor 32 and thereby threaten the containment vessel integrity is reduced.

Figure 4:
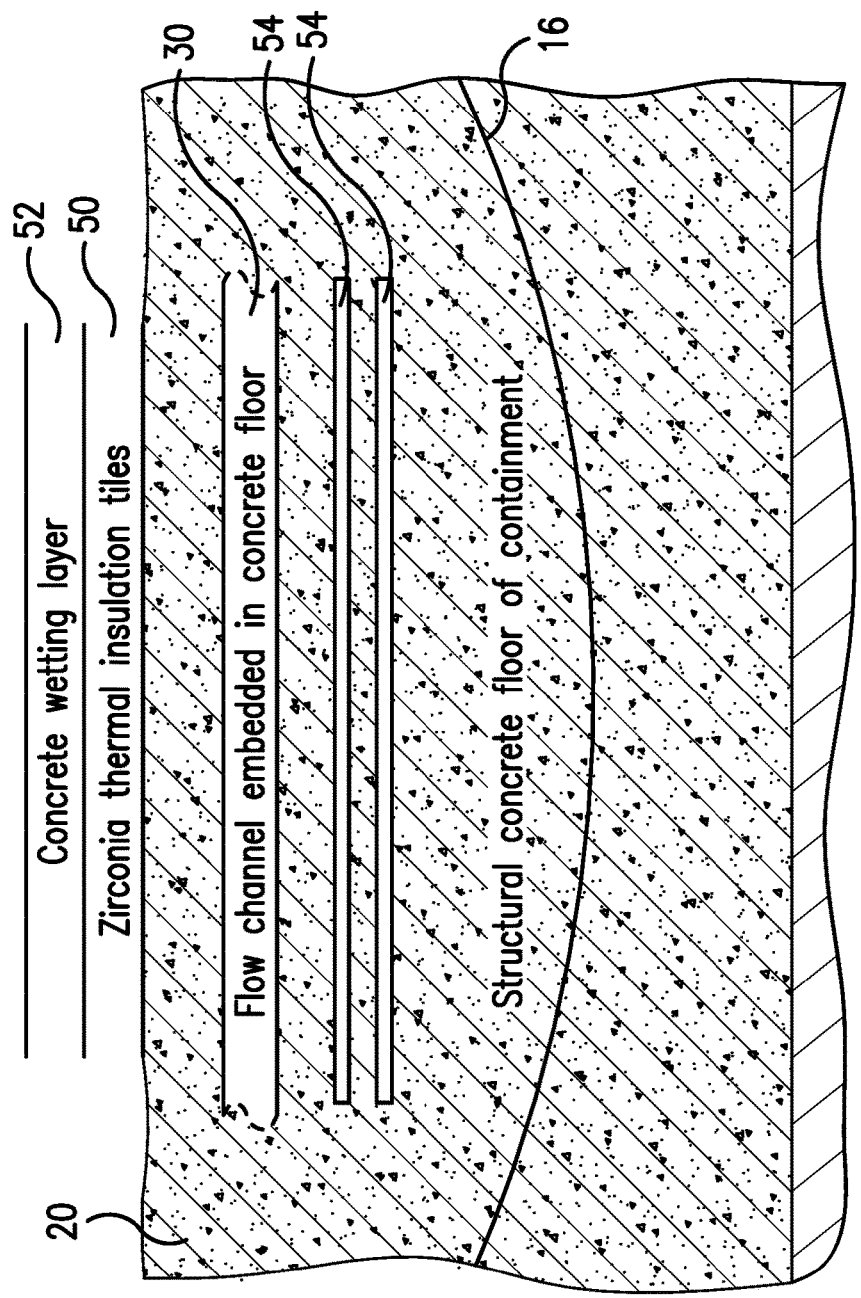
FIG. 4 diagrammatically shows conduits of the reactor cavity floor passive heat removal system in a suitable cavity floor structural context.

With reference to FIG. 4, the construction of the reactor cavity floor 32 (or, more generally, the construction of the concrete floor located underneath the nuclear reactor in which the flow channels 30 are embedded) can take various forms or constructions. In the illustrative example of FIG. 4, the concrete floor 20 is modified in the area of the reactor cavity floor 32 by embedding the flow channels 30, and also by disposing zirconia thermal insulation tiles 50 on top of the structural concrete 20. Optionally, a concrete layer 52 is disposed on the zirconia insulation 50. The concrete layer 52 serves as a wetting layer for the corium, which causes the corium to spread out across the cavity floor 32 so as to promote cooling of the corium. Optionally, one or more metal plates 54 are embedded in the concrete floor 20 underneath the nuclear reactor. These metal plates 54 serve as "stops" for any cracks that may form in the structural concrete 20 due to heating by the ex vessel-situated corium. The metal plates 54 may be located below the flow channels 30 as shown in diagrammatic FIG. 4, or may be located above the flow channels 30 if the plates 54 are made of a relatively thermally conductive material (as compared with the concrete 20) such as steel. The metal plates 54 are preferably located inside the containment, that is, above the lower dome of the steel containment 16, so as to be positioned to stop any concrete cracking before it reaches that lower dome.

The flow channels 30 can be formed in various ways, using various materials. In some embodiments the flow channels 30 embedded in the concrete floor 32 located underneath the nuclear reactor comprise metal pipes embedded in the concrete floor located underneath the nuclear reactor. These metal pipes can be laid down prior to pouring the concrete, so that they are then embedded in the poured concrete after it sets. Since the pipes are not structural elements, they can be made thin. Rather than metal pipes, ceramic or plastic (e.g. polyvinyl chloride or PVC) pipes can be used, preferably chosen to be of a thermally conductive material and/or to be thin so as to minimize the thermal barrier presented by the plastic pipes.

In another approach, since the flow channels 30 are not structural elements they can be tubular vacancies in the concrete floor 32 located underneath the nuclear reactor. Such tubular vacancies in the concrete floor can be formed, for example, by pouring the concrete floor over tubular elements, allowing the poured concrete to set, and then removing the tubular elements by suitable chemical dissolution, drilling, or the like. It is further contemplated that forming material may remain in the structure as a sacrificial element and dissolved during an event such that the channels formed remain.

It will be appreciated that the number and diameter of the flow channels 30, as well as their layout (for example, straight versus serpentine) can be chosen based on the design basis thermal conductance desired to limit concrete ablation, using thermal modeling assuming a maximum credible corium temperature (3100K in some design basis approaches) at the top surface of the floor 32 and accounting for the thermal insulation provided by the zirconia insulation layer 50 (which is readily computed based on the thermal conductivity of the material and the layer thickness).

With returning reference to FIG. 2, the inlet 34 and outlet 36 are connected with the inlet header 40 and outlet header 42, respectively, by respective vertical flow channels embedded in the sidewall of the reactor cavity 24. These vertical flow channels, as well as the headers 40, 42, can be embedded using the above-described approaches for embedding the horizontal flow channels 30. It is also contemplated for the vertical flow channels to be located inside the reactor cavity 24, rather than being embedded in the sidewalls of the reactor cavity 24 as shown.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

We claim:

1. A nuclear island comprising:
   a nuclear reactor including a reactor core comprising fissile material disposed in a reactor pressure vessel;
   a radiological containment containing the nuclear reactor, the radiological containment including a reactor cavity defined by a concrete floor located underneath the nuclear reactor and a sidewall extending upwardly therefrom so that a lower portion of the reactor pressure vessel is disposed radially inwardly of the sidewall of the reactor cavity; and
   an ex vessel corium retention system including flow channels entirely embedded in the concrete floor located underneath the nuclear reactor, an inlet in fluid communication with first ends of the flow channels, and an outlet in fluid communication with second ends of the flow channels,
   wherein the inlet and the outlet are disposed on an inner surface of the sidewall of the reactor cavity.

2. The nuclear island of claim 1 wherein the inlet is in fluid communication with the interior of the radiological containment at a first elevation and the outlet is in fluid communication with the interior of the radiological containment at a second elevation higher than the first elevation.

3. The nuclear island of claim 2 further comprising:
   a refueling water storage tank (RWST) disposed inside the radiological containment and connected with the inlet to drain water from the RWST into the inlet.

4. The nuclear island of claim 1 wherein the inlet is in fluid communication with the reactor cavity at a first elevation and the outlet is in fluid communication with the reactor cavity at a second elevation higher than the first elevation.

5. The nuclear island of claim 4 wherein the first elevation is above a level of an expected corium melt that relocates ex vessel onto the reactor cavity floor.

6. The nuclear island of claim 1 wherein the inlet comprises a flow channel embedded in a sidewall of the reactor cavity and the outlet comprises a flow channel embedded in a sidewall of the reactor cavity.

7. The nuclear island of claim 1 wherein the ex vessel corium retention system further includes:
   an inlet header embedded in concrete defining the radiological containment and in fluid communication with both the inlet and the first ends of the flow channels; and
   an outlet header embedded in concrete defining the radiological containment and in fluid communication with both the outlet and the second ends of the flow channels.

8. The nuclear island of claim 1 wherein the flow channels embedded in the concrete floor located underneath the nuclear reactor comprise pipes embedded in the concrete floor located underneath the nuclear reactor.

9. The nuclear island of claim 1 wherein the flow channels embedded in the concrete floor located underneath the nuclear reactor comprise metal pipes embedded in the concrete floor located underneath the nuclear reactor.

10. The nuclear island of claim 1 wherein the flow channels embedded in the concrete floor located underneath the nuclear reactor comprise tubular vacancies in the concrete floor located underneath the nuclear reactor.

11. The nuclear island of claim 1 wherein the flow channels embedded in the concrete floor located underneath the nuclear reactor comprise tubular vacancies in the concrete floor located underneath the nuclear reactor formed by pouring the concrete floor located underneath the nuclear reactor over tubular elements, allowing the poured concrete to set, and then removing the tubular elements.

12. The nuclear island of claim 1 wherein the ex vessel corium retention system further includes zirconia insulation disposed on the concrete floor located underneath the nuclear reactor.

13. The nuclear island of claim 12 wherein the ex vessel corium retention system further includes a concrete layer disposed on the zirconia insulation.

14. The nuclear island of claim 12 wherein the ex vessel corium retention system further includes one or more metal plates embedded in the concrete floor located underneath the nuclear reactor.

15. The nuclear island of claim 12 wherein the flow channels embedded in the concrete floor located underneath the nuclear reactor are straight flow channels.

* * * * *